ns and Company

United States Patent

[11] 3,599,880

[72] Inventor Alexander M. Janowski
 Colonia, N.J.
[21] Appl. No. 809,959
[22] Filed Mar. 24, 1969
[45] Patented Aug. 17, 1971
[73] Assignee E. I duPont, de Nemours and Company
 Wilmington, Del.

[54] LEAD-CHROMATE-BASED PIGMENT
 2 Claims, No Drawings
[52] U.S. Cl. ....................................................... 241/19,
 106/298, 241/27, 241/29
[51] Int. Cl. ....................................................... B02c 13/24,
 B02c 13/00, C09c 1/20
[50] Field of Search .......................................... 241/19, 24,
 27, 29; 106/298; 23/56, 57

[56] References Cited
 UNITED STATES PATENTS

| | | | |
|---|---|---|---|
| 2,214,815 | 9/1940 | Hanahan ...................... | 241/29 |
| 2,337,162 | 12/1943 | McCleary ..................... | 241/19 |
| 2,857,400 | 10/1958 | Cooper ......................... | 241/29 X |
| 3,224,686 | 12/1965 | Wallace ........................ | 241/19 |
| 3,470,007 | 9/1969 | Linton .......................... | 106/298 |

Primary Examiner—Donald G. Kelly
Attorney—Frank R. Ortolani

ABSTRACT: Method of preparing improved lead-chromate-based pigments, for particular application in printing inks and paints, in which lead chromate is first impact ground to pulverize it, the oversize particles are selectively removed from the product and recirculated, and the pulverized output is further subjected to disintegration and discharged through a classification means to result in improved pigment.

LEAD-CHROMATE-BASED PIGMENT

BACKGROUND OF THE INVENTION

This invention relates to the production of lead-chromate-based pigments which are substantially uniform in particle size and are particularly adapted for use in printing inks and paints. The lead-chromate-based pigments to be processed include the well known "medium" chrome yellow of rather dark red shade, the "light" chrome yellows, the "primrose" shades of light green pigment, and also the "molybdate oranges." Specific pigments are the following (references being to the Color Index, 2nd ed. 1956, by the Society of Dyers and Colourists, England, and the American Association of Textile Chemists and Colorists, United States): Chrome Yellow—CI 77600; Basic Lead Chromate—CI 77601; Molybdate Orange or Red—CI 77605. The color of these pigments is primarily due to their lead chromate content.

Although lead chromate pigments such as those named must be subjected to one or more grinding processes to produce them for use in ink, paints, and the like, many of the grinding processes of the prior art have not been satisfactory. The reason for this has been twofold: first, many of the grinding processes which have been employed have resulted in pigment of very nonuniform particle size. Although a portion of the pigment may be very finely ground, or optimum, other fractions of the pigment have been far outside this particle size range giving undesirable properties to the entire pigment lot. Secondly, many prior art grinding methods result in a pigment product of more uniform particle size, but the grinding is not to a degree which permits optimum dispersion of the pigment in the end-use vehicle.

SUMMARY OF THE PRESENT INVENTION

The present discovery provides improved lead-chromate-based pigment by a process comprising the steps of subjecting the pigment to the action of a pulverizing mill, air classifying the resulting ground product and recycling the oversize particles to the pulverizing mill, then subjecting the product of this pulverizing air-classifying system to a second grinding in a disintegrating mill. This combination of pulverizing, classifying, and disintegrating the pigment produces lead-chromate-based product superior to that produced by any prior art grinding method or by any known combination of grinding methods; the uniform pigment product obtained is particularly well adapted for use in inks known in modern printing technique as flexogravure inks.

In carrying out the present invention, the use of various known grinding equipment is possible. For example, for pulverization of the lead chromate material, use of mills which essentially abrade the feed against the mill surfaces or other moving parts within the mill, which are impact mills. The pigment which is being ground, following the pulverization step, is air classified so that oversized particles, if any, may be recirculated to the pulverizing mill. An example of such a pulverization-classification system which can be used effectively in this invention is that shown in U.S. Pat. No. 3,224,686, to Wallace. The entire disclosure of that patent is hereby incorporated herein by reference.

The type of grinding and classifying equipment which has been found satisfactory for the first step of the present process, grinds with a rotor, which is of a modified interdigitating pin mill type comprising blades. Classification is brought about by air and a rotating classifying chamber which give the particles a rotary direction, the same as that created by the grinding chamber. Pigment particles suspended in the classification chamber are subjected to the force of the air drawing pigment material toward the center and are drawn in an opposite or outward direction by the centrifugal force created by the rotation of the classification section. By the action of these two opposing forces on the pulverized pigment particles, classification is efficiently carried out. For further detail of the apparatus, see the cited Wallace patent.

In the foregoing general manner, the grinding air-classifying system produces a pulverized product of uniform small particle size material (2 to 3 microns) which is collected for the feed to the disintegrating mill. Oversize particles (20 to 30 percent of the original feed) are ejected outwardly on a tangent in the classifying system to be returned for regrinding through the grinding mill. A milling and classifying apparatus which has been found completely satisfactory for commercial production of pigment according to the process of this invention is one in which 2,000 pounds of pigment can be ground and classified per hour with a rotor operating at approximately 3,550 r.p.m. and the air fan operating at 3,500 r.p.m.

The second grinding step of the process of this invention comprises subjecting the pulverized classified lead-chromate-based pigment to the action of a mill of the general type known as disintegrating mills, or "hammer" mills. Such mills are illustrated by the so-called "Mikropulverizer" having a perforated plate or screen discharge as an essential component part of the grinding system. A disintegrating mill which has been found very satisfactory is of approximately 24 inches outside diameter and is of the type designated by the Pulverizing Machinery Company as T-24-6. The operational portion of this grinding mill comprises stirrup-type hammers, each 3½×3¼ inches mounted in 24 rows of four hammers in each row. The mill can be operated up to a maximum speed of 3,500 r.p.m. The micropulverizer also has a steel screen at the discharge, the screen having ⅛-inch round perforations. To carry out the grinding process for producing the pigments which are more completely described in the examples below, the micropulverizer was run at near its maximum speed of 3,500 r.p.m. with a hammer-to-liner clearance of three and three thirty second inch, and an approximate throughput rate of 4,000 pounds per hour.

In order to show the improvement in pigment quality which is obtained by the process of this invention, several different lead chromate pigments have been ground according to the following five combinations:

| First Grinding | Second Grinding |
|---|---|
| (a) Pulverizing mill and pigment air-classified, as in U.S. Pat. No. 3,224,686 | None |
| (b) Pulverizing mill and pigment air-classified, as in U.S. Pat. No. 3,224,686 | Repeat of first grinding process |
| (c) Micropulverized | Micropulverized |
| (d) Micropulverized | Pulverized and air-classified as (a) |
| (e) Pulverized and air-classified as in (a) | Micropulverized |

Various lead-chromate-based pigments were subjected to the combinations of grinding classifying and regrinding given as (a) through (e) and were tested as stated hereinafter.

To prepare the inks and paint mixes for tests (summarized below), flexogravure inks were prepared in polyamide vehicles and in nitrocellulose vehicles, and paint mixes were prepared according to the following procedures.

Tests in polyamide vehicle are carried out as follows:

To prepare the polyamide vehicle, 450 grams of normal propyl alcohol and 450 grams of varnish makers and painters solvent naphtha (Naphtha V.M. and P, Humble Oil Company), are placed in a ½-gallon widemouth screwcap jar and 600 grams of "Versamid" 930 (a polyamide resin of General Mills), are added. The jar and contents are rolled overnight. Inks are prepared by grinding the polyamide vehicle with an equal weight of pigment.

A white tinting ink is prepared using 100 grams of titanium dioxide R–902, Du Pont Company) and 100 grams of polyamide vehicle. The mix thereof is ground for 16 hours in a 16-ounce jar, containing about one half pint of ½-inch ceramic balls. Colored inks are prepared in the same manner, substituting the colored pigments for the titanium dioxide. For tinctorial strength tests the inks thus prepared are extended by adding 80 parts of white tinting ink to 20 parts of the color ink to be tested. Drawdowns are prepared on litholabel paper (60 pounds stock, D. L. Ward Co., Philadelphia, Pa.) using a number 5 equalizer rod (R. D. Specialties Company, Rochester, N.Y.).

In the cases where nitrocellulose ink is prepared, the following procedure is used:

Nitrocellulose vehicle is prepared by mixing the following ingredients in a half-gallon widemouth jar and rolling overnight:

145 grams ¼-inch alcohol wet organic-soluble nitrocellulose 70 percent solids
145 grams ½-inch alcohol wet organic-soluble nitrocellulose
122 grams ethyl alcohol
150 grams butanol
930 grams lacquer solvent
8 grams tricresyl phosphate To formulate the flexogravure ink, 150 grams of the nitrocellulose vehicle and 150 grams of the pigment to be tested are ground using ½-inch ceramic balls. A 16-ounce jar mill half filled with balls is rolled for 16 hours on the mill. Drawdowns are made as given above for strength evaluations.

For testing the ground pigment in paint systems, a general purpose alkyd enamel is prepared and graded for gloss and strength in tints. To prepare this paint, a general purpose alkyd vehicle (Syntex 62, Jones-Dabney Co.), is used with the pigment to be tested, and mineral spirits. To prepare the mill base, 300 grams of pigment, 200 grams of Syntex 62, and 60 grams of mineral spirits are placed in a ⅓-gallon porcelain mill approximately half filled with ½-inch ceramic balls. The mill is rolled for 48 hours. A first reduction is made by adding 200 grams of Syntex 62, and the grinding is continued for 30 minutes. The mill contents are then strained and a second reduction made by using 650 grams of the ground mill base, 235 grams of Syntex 62, and 20 grams of mineral spirits. Drawdowns for gloss are prepared using a number 8 equalizer rod (R. D. Specialties Company, Rochester, N.Y.) on polyester film and aluminum foil. The paints are rated according to the paint gloss test given in Physical and Chemical Examination: Paints, Varnishes, Lacquers, and Colors, by Gardner-Sward, Gardner Lab., Inc. 12th ed. 1962, page 85.

The following Examples will illustrate the process of the present invention.

EXAMPLE 1

Medium chrome-yellow pigment is milled according to each of the procedures given above as (a), (b), (d), (e). The resulting ground pigment is used in polyamide formulation and the resulting product is tested for gloss on masstone, and for tinctorial strength when formulated in tints. The data obtained are:

Table 1

| Grinding Method | Gloss | Tinctorial Strength |
|---|---|---|
| | (on masstone) | (on tints) |
| (a) | standard (std.) | standard (std.) |
| (b) | slightly better than standard (sl +) | equal to standard (=) |
| (d) | low v. standard (low) | weaker than standard (weak) |
| (e) | high v. standard (high) | slightly better than standard (sl +) |

EXAMPLE 2

Using a portion of the same medium chrome yellow pigment, a formulation is prepared in which nitrocellulose vehicle is used. The results which are obtained when the pigment is ground according to the procedures given above are as follows:

Table 2

| Grinding Method | Gloss | Tinctorial Strength—(Tints) |
|---|---|---|
| (a) | std. | std. (100) |
| (b) | sl + | 95—97% |
| (d) | low | 103% |
| (e) | high | 90—95% |

In these data as well as those given hereinafter, the percentage values given under "Tinctorial Strength" indicate the weight percent of the pigment of the example required to obtain a tinctorial strength equal to a standard pigment.

EXAMPLE 3

In addition to being tested for use in flexogravure inks, as given in the two experiments just above, a portion of the same pigment ground according to the processes (a), and (e) above is formulated in a paint system and tested according to the Gardner-Sward paint gloss test referred to above. Results of these tests are shown in the following table:

Table 3

| Grinding Method | Gardner-Sward Glossmeter Test 20° | Strength (Tints) |
|---|---|---|
| (a) | 60 | std. |
| (e) | 70 | 90% |

EXAMPLE 4

Using a different chrome pigment, specifically a light yellow pigment, and incorporating this pigment in a nitrocellulose vehicle for testing in flexogravure inks, the following results are obtained when grinding methods indicated as (a) and (e) above are used:

Table 4

| Grinding Method | Gloss | Strength |
|---|---|---|
| (a) | std. | std. |
| (e) | high | 95% |

EXAMPLE 5

In still further experiments primrose chrome yellow pigment is used in nitrocellulose vehicle. Tests results from the pigments ground according to procedures (a) and (e) above are as follows:

Table 5

| Grinding Method | Gloss | Strength |
|---|---|---|
| (a) | std. | std. |
| (e) | high | 95% |
| (e) on Al | high | |

EXAMPLE 6

Using a molybdate orange pigment in polyamide vehicle, gloss and strength tests are run on pigment ground according to procedures (a) and (e) above. The results obtained were as follows:

Table 6

| Grinding Method | Gloss | Strength |
| --- | --- | --- |
| (a) | std. | std. |
| (e) | v. high | 80—85% |

EXAMPLE 7

An additional molybdate orange sample is tested in a polyamide vehicle and results obtained in pigment ground according to procedures (a), (b), (c), and (e) are:

Table 7

| Grinding Method | Gloss | Strength |
| --- | --- | --- |
| (a) | std. | std. |
| (b) | sl. high | 90—95% |
| (c) | low | = |
| (e) | v. High | 80—85% |

According to the results shown above, in which the pigment ground according to the several procedures given was tested in a variety of vehicles for use in inks and paints, it will be seen that superior results have been obtained when the pigment is first ground in a pulverizing mill, from which pigment is air classified and the oversize particles are recirculated to the pulverizing mill, and this first milling is followed by passing the pigment through a disintegrating mill which includes a foraminous sheet at the outlet. Although the reason for the improved pigment properties obtained in this invention is not entirely clear, it may be as follows: The effect of grinding the pigment through the pulverizing mill is such that hard aggregates of pigment are broken up, but as further grinding of the pigment takes place, the fine particles resulting from breaking up of the hard aggregates are agglomerated into other aggregates of softer texture. These aggregates, being lighter in weight than the hard particles of crude feed to the pulverizing mill, are discharged from the air classifier along with any finer particles which remain unagglomerated, and are then passed to or charged into the second grinding or pulverizing system. In this grinding step, the soft agglomerates of pigment are broken up and the resulting product is a pigment of highly uniform fine particle size. Because of this uniformity of particle size as well as the small average particle size of the material, the excellent properties of gloss and tinctorial strength shown by the above tests are obtained. Actual particle size determination at these pigmentary levels is difficult and since it is known that gloss is affected by particle size and its uniformity, the definite gloss improvement herein confirms the effectiveness of the process in achieving the product of uniformly small size.

I claim:

1. A process for producing lead-chromate-based pigment of improved high gloss and high tinctorial strength, which comprises the steps of subjecting lead-chromate-based pigment to the action of an impact pulverizing-type mill, air classifying the pigment from said pulverizing mill to remove a fraction comprising oversize particles therefrom and result in a fraction of uniformly fine particle size, passing the fine particle size fraction of said air-classified pigment to a disintegrating mill to further grind said pigment and discharging the product of said mill as product.

2. The process according to claim 1 in which the fine particle size fraction from said air classifying step has particles substantially all of about 2 to 3 microns, and said product from said disintegrating zone exits said zone through a foraminous member.